(12) United States Patent
Li et al.

(10) Patent No.: US 10,859,255 B1
(45) Date of Patent: Dec. 8, 2020

(54) HANDHELD FLASHLIGHT

(71) Applicant: Shenzhen Chifrog Technology Co., Ltd., Shenzhen (CN)

(72) Inventors: Fang Li, Shenzhen (CN); Yunzheng Jiang, Shenzhen (CN)

(73) Assignee: Shenshen Chifrog Technology Co., Ltd., Shenzhen (CN)

(*) Notice: Subject to any disclaimer, the term of this patent is extended or adjusted under 35 U.S.C. 154(b) by 0 days.

(21) Appl. No.: 16/857,022

(22) Filed: Apr. 23, 2020

Related U.S. Application Data

(63) Continuation-in-part of application No. 16/255,495, filed on Jan. 23, 2019, which is a continuation of
(Continued)

(51) Int. Cl.
| | |
|---|---|
| *B25B 23/18* | (2006.01) |
| *F21V 33/00* | (2006.01) |
| *F21L 4/08* | (2006.01) |
| *F21V 23/06* | (2006.01) |
| *H02J 7/00* | (2006.01) |
(Continued)

(52) U.S. Cl.
CPC .......... *F21V 33/0064* (2013.01); *F21L 4/085* (2013.01); *F21V 23/0428* (2013.01);
(Continued)

(58) Field of Classification Search
CPC .. F21V 33/0064; F21V 23/0428; F21V 23/06; F21V 2115/10; F21L 4/085; H02J 7/0045; A62B 3/00
(Continued)

(56) References Cited

U.S. PATENT DOCUMENTS 4,325,107 A * 4/1982 MacLeod ................ F21L 4/085
362/183
6,273,586 B1 * 8/2001 Schuloff ................ F21L 4/005
362/204
(Continued)

FOREIGN PATENT DOCUMENTS

CN 203445643 U 2/2014

OTHER PUBLICATIONS

"Jump Starter Expert", accessed at http://jumpstarterexpert.com/rocket-socket-flashlight-jump-starter/ on Jun. 26, 2016 via wayback machine at https ://web.archive.org/web/20160626133133/http ://jumpstarterexpert.com/rocket-socket-flashlight-jump-starter/.

*Primary Examiner* — Ali Alavi
(74) *Attorney, Agent, or Firm* — Calfee, Halter & Griswold LLP

(57) ABSTRACT

A handheld flashlight includes a hollow cylinder having a first end and a second end, and a rechargeable battery therein. The handheld flashlight further includes a lamp head with a light source, a window breaker, a charging port and a discharging port, selectively connected to an external power source or an external load; a connection port, selectively connected to positive and negative terminals of a vehicle battery through external cables; and a management circuit, selectively applying power from the battery to one or more of the light source, the discharging port, and the connection, and selectively charging the battery from the external power source through the charging port; wherein the handheld flashlight is of such compact size and low weight as to be suitable for single-handed portable operation by a user.

17 Claims, 7 Drawing Sheets

Related U.S. Application Data application No. 15/636,138, filed on Jun. 28, 2017, now abandoned.

(60) Provisional application No. 62/443,657, filed on Jan. 7, 2017.

(51) Int. Cl.
*F21V 23/04* (2006.01)
*A62B 3/00* (2006.01)
*F21Y 115/10* (2016.01)

(52) U.S. Cl.
CPC ............ *F21V 23/06* (2013.01); *H02J 7/0045* (2013.01); *A62B 3/00* (2013.01); *F21Y 2115/10* (2016.08)

(58) Field of Classification Search
USPC .......................................... 362/119, 183, 202
See application file for complete search history.

(56) References Cited

U.S. PATENT DOCUMENTS

| | | |
|---|---|---|
| 9,007,015 B1 | 4/2015 | Nook |
| 9,793,750 B2 | 10/2017 | Miller |
| 9,923,393 B2 | 3/2018 | Workman |
| 2002/0022159 A1 | 5/2002 | Pierson |
| 2002/0121877 A1* | 9/2002 | Smith ............... H02J 7/0042 320/103 |
| 2005/0157492 A1 | 7/2005 | Chiu |
| 2009/0009991 A1 | 1/2009 | Liu |
| 2009/0257223 A1* | 10/2009 | Liu ................... F21L 4/085 362/206 |
| 2011/0068741 A1* | 3/2011 | Liu ................... A01K 97/02 320/114 |
| 2013/0063077 A1* | 3/2013 | Popper ............. H02J 7/0045 320/107 |
| 2015/0003050 A1 | 1/2015 | Parsons |
| 2015/0054336 A1* | 2/2015 | Xinfang ............ H02J 7/342 307/9.1 |
| 2015/0103517 A1* | 4/2015 | Maglica ........... F21V 23/0414 362/183 |
| 2016/0084454 A1 | 3/2016 | Svitak |
| 2016/0153626 A1 | 6/2016 | Ozaka |
| 2016/0181587 A1 | 6/2016 | Koebler |
| 2017/0012448 A1* | 1/2017 | Miller .............. H02J 7/0047 |
| 2017/0299130 A1* | 10/2017 | Li .................... H02J 7/0045 |
| 2018/0006470 A1* | 1/2018 | Stacey ............. H01M 10/4257 |

* cited by examiner

# HANDHELD FLASHLIGHT

CROSS-REFERENCE TO RELATED APPLICATIONS

This application is a continuation-in-part of U.S. patent application Ser. No. 16/255,495, filed Jan. 23, 2019, which is a continuation of U.S. patent application Ser. No. 15/636,138, filed Jun. 2, 2017, which claims the benefit of Chinese Patent Application No. 201620730751.3, filed Jul. 12, 2016, and U.S. Provisional Application No. 62/443,657, filed Jan. 7, 2017, the entire disclosures of which are hereby incorporated herein by reference.

TECHNICAL FIELD

The present subject matter is related generally emergency power supply devices, and more specifically to a handheld flashlight capable of outputting multiple voltages and regulating temperature.

BACKGROUND

People, car and life form a representation of attitude, style and life manner. When increasing number of people are enjoying the life with car, deep care and maintenance of the car are necessary. Besides a USB car charger, Bluetooth, GPS, and recorder, people still need an emergency response device which, in case of emergency in driving, can start their cars, illuminate at night, charge their phones, and function as a self-defense tool in emergency condition.

Traditional emergency response devices (e.g., jump starters) are sufficient for jumpstarting a car when conditions are ideal (e.g., when the outside temperature is within a working temperature range for the car batter). However, in conditions that are not ideal (e.g., when the outside temperature is lower than, for example, the lowest operating (working) temperature for the car battery), traditional jump starters do not work well. Additionally, conventional jump starters are generally not useful for vehicles with different voltages (e.g., 6V/12V/24V vehicles).

In view of the above temperature and voltage limitations of traditional jump starters, there is an unmet need for an improved power supply device that is able to supply power to a battery (e.g., a car batter) in any weather condition (e.g., less than ideal conditions) and at various voltages, as needed.

SUMMARY

The present subject matter discloses a handheld flashlight. The handheld flashlight comprises a hollow cylinder having a first end and a second end, wherein the hollow cylinder is configured to receive therein and mount thereon a rechargeable battery; a lamp head, connected the first end of the hollow cylinder and comprising a light source; a window breaker, configured to break windows for emergency vehicular escape; a charging port and a discharging port, selectively connected to an external power source or an external load; a connection port, selectively connected to positive and negative terminals of a vehicle battery through external cables; and a management circuit, selectively applying power from the rechargeable battery to the light source, the discharging port, and the connection port, and selectively charging the rechargeable battery from the external power source through the charging port; wherein the handheld flashlight is of such compact size and low weight as to be suitable for single-handed portable operation by a user. In some embodiments, one or more ports may have dual functionality (e.g., a charging-discharging functionality and/or the functionality of two or more ports (e.g., the discharging port and connection port)).

In yet a further exemplary embodiment, the handheld flashlight is configured to output multiple voltages. In some embodiments, when operating the handheld flashlight, only a single voltage is outputted. In other embodiments, multiple voltages may be outputted simultaneously.

One or more of circuits boards and/or assemblies (e.g., a management circuit, an additional switch control circuit, and a switch assembly) may be provided for controlling or otherwise managing the multiple voltage outputs.

Therefore, the present general inventive concept provides a handheld flashlight capable of outputting multiple voltages, comprising two or more power supply assemblies, a first assembly (e.g., a switch assembly) and a control circuit (e.g., a switch control circuit), wherein: each power supply assembly is used for outputting a specific voltage value, and the two ends of each power supply assembly are respectively electrically connected directly or indirectly with an output of the handheld flashlight; the switch assembly comprises at least one electric control switch; the at least one electric control switch is connected in series between one power supply assembly and the output of the handheld flashlight, and/or between different power supply assemblies; an input of the switch control circuit receives a voltage switching signal; an output of the switch control circuit outputs a switch control signal corresponding to the voltage switching signal to a controlled end of each electric control switch; and each electric control switch is switched on or off under control of the switch control signal, so that the power supply assemblies are connected in series or in parallel, and thus different voltage values can be outputted by the output end of the handheld flashlight.

In some embodiments, the handheld flashlight comprises two power supply assemblies, which are respectively, a first power supply assembly and a second power supply assembly; and the switch assembly comprises three electric control switches, which are respectively a first electric control switch, a second electric control switch, and a third electric control switch; wherein: a first end of the first power supply assembly is electrically connected with a first end of the handheld flashlight, and a second end of the first power supply assembly is connected with a first end of the first electric control switch; a second end of the first electric control switch is connected with a first end of the second power supply assembly, and a second end of the second power supply assembly is connected with a second end of the handheld flashlight; a first end of the second electric control switch is connected with the first end of the first power supply assembly, and a second end of the second electric control switch is connected with the second end of the first electric control switch; and a first end of the third electric control switch is connected with the second end of the first power supply assembly, and a second end of the third electric control switch is connected with the second end of the second power supply assembly.

Additionally, or alternatively, the first power supply assembly and the second power supply assembly each comprise a plurality of lithium iron phosphate batteries connected in series.

In some embodiments, each of the first power supply assembly and the second power supply assembly consists of two lithium batteries connected in series; or, each of the first power supply assembly and the second power supply assembly consists of three lithium iron phosphate batteries connected in series.

In some embodiments, the first electric control switch, the second electric control switch and the third electric control switch are all MOS transistors, a gate of each of the MOS transistors is used as the controlled end, and a source and a drain of each of the MOS transistors are used as the first end and the second end.

In some embodiments, the switch control circuit comprises a controller; and an input of the controller is used for receiving the voltage switching signal; a first output of the controller is electrically connected with the gate of the MOS transistor of the first electric control switch, a second output of the controller is electrically connected with the gate of the MOS transistor of the second electric control switch, and a third output of the controller is electrically connected with the gate of the MOS transistor of the third electric control switch.

In some embodiments, when the voltage switching signal corresponds to a low voltage value, the controller outputs a switch control signal to switch off the first electric control switch but switch on the second electric control switch and the third electric control switch; and a voltage value outputted by the output of the handheld flashlight is a voltage value produced by the first power supply assembly and the second power supply assembly connected in parallel; and when the voltage switching signal corresponds to a high voltage value, the controller outputs a switch control signal to switch on the first electric control switch and switches off the second electric control switch and the third electric control switch; and a voltage value outputted by the output of the handheld flashlight is a voltage value produced by the first power supply assembly and the second power supply assembly connected in series.

Additionally, or alternatively, the handheld flashlight further comprises a voltage sensor, wherein: the voltage sensor is used for detecting a voltage value of a device to be connected and outputting a voltage signal representing the voltage value of the device to be connected, and if the voltage signal is within a normal voltage value range, the voltage signal is used as the voltage switching signal.

In some embodiments, the handheld flashlight further comprises a temperature sensor and a temperature regulating plate, wherein: the temperature sensor is used for detecting a temperature of the handheld flashlight and outputting a temperature signal representing the temperature of the handheld flashlight to the switch control circuit; after the temperature signal is received by the switch control circuit, if the temperature signal indicates that the temperature of the handheld flashlight is lower than a lower limit threshold or higher than an upper limit threshold, a temperature regulating signal is outputted by the output of the switch control circuit; and the temperature regulating plate is arranged in the power supply assembly, and the temperature regulating signal is received by a controlled end of the temperature regulating plate to raise or lower the temperature of the power supply assembly.

In yet a further exemplary embodiment, a method of outputting multiple voltages via a handheld flashlight includes at least the following: in response to a voltage switching signal, determining series/parallel relations between different power supply assemblies according to the voltage switching signal, and determining a state of each electric control switch according to the series/parallel connection relations; obtaining a switch control signal according to the state of each electric control switch; and sending the switch control signal to each electric control switch.

Additionally, or alternatively, the outputting method includes, before the step in response to the voltage switching signal, determining the series/parallel connection relations between different power supply assemblies according to the voltage switching signal, and determining the state of each electric control switch according to the series/parallel relations, the method further comprises: acquiring a temperature signal, and determining the temperature of the handheld flashlight according to the temperature signal; and outputting a temperature regulating signal to the temperature regulating plate if the temperature of the handheld flashlight is lower than the lower limit threshold or higher than the upper limit threshold.

Additionally, or alternatively, the outputting method includes, before the step in response to the voltage switching signal, determining the series/parallel connection relations between different power supply assemblies according to the voltage switching signal, and determining the state of each electric control switch according to the series/parallel relations, the method further comprises: acquiring a voltage signal representing a voltage value of a device to be connected, and using the voltage signal as the voltage switching signal if the voltage signal is within a normal voltage value range.

Additionally, or alternatively, in an exemplary embodiment of the method of outputting multiple voltages, the step of acquiring the voltage signal representing the voltage value of the device to be connected, and using the voltage signal as the voltage switching signal if the voltage signal is within the normal voltage value range comprises: if the voltage signal indicates that the voltage value of the device to be connected is higher than a set threshold voltage, determining that the voltage switching signal corresponds to a high voltage value; otherwise, determining that the voltage switching signal corresponds to a low voltage value.

Additionally, or alternatively, in an exemplary embodiment of a method of outputting multiple voltages, the step of acquiring the voltage signal representing the voltage value of the device to be connected, and using the voltage signal as the voltage switching signal if the voltage signal is within the normal voltage value range further comprises: if the voltage signal is not within the normal voltage value range, determining that the voltage value of the device to be connected is abnormal, and sending a switching-off signal to each electric control switch.

It should be appreciated that compared to known devices, the foregoing technical solutions provided by embodiments of the present general inventive concept includes at least the following advantageous effects: according to the handheld flashlight capable of outputting multiple voltages and the control method thereof provided by the exemplary embodiments, the series/parallel connection relations of different power supply assemblies are controlled by arranging more than two power supply assemblies and utilizing the switching on or off of the electric control switch, so that the output of the handheld flashlight can output different voltage values. A user can output different voltage values by using one handheld flashlight only, thus meeting the use conditions of various vehicles at a low cost.

DETAILED DESCRIPTION

Figure 1:
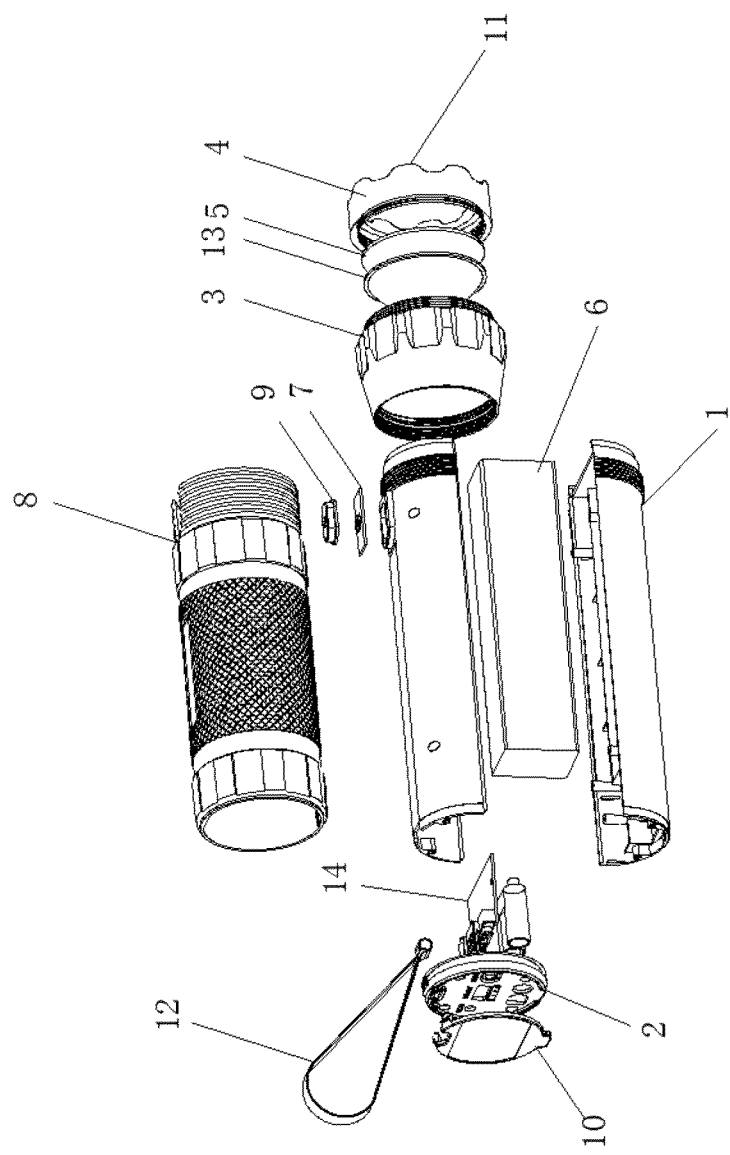
FIG. 1 is an explored drawing of a flashlight, in accordance with the general inventive concepts.

Features and advantages of the general inventive concepts will become apparent from the following detailed description made with reference to the accompanying drawings.

In the following exemplary embodiments, the terms "first", "second" and "third" are used for descriptive purposes only and cannot be understood as indicating or implying relative importance. The terms "first position" and "second position" are two different positions. The technical solutions in the following embodiments provided by the invention can be combined with each other unless the technical solutions are contradicted with each other, and the technical features therein can be replaced with each other.

In the description of the exemplary embodiments, it should be understood that if the orientation or positional relationship indicated by the terms "middle", "upper", "lower", "left", "right", "vertical", "horizontal", "inner", "outer" and the like is based on the orientation or positional relationship shown in the drawings, it is only for the convenience of describing the invention and simplifying the description, and it is not to indicate or imply that the indicated device or element must have a specific orientation, be constructed and operate in a specific orientation. Therefore, the terms should not be construed as limiting the invention. Moreover, the terms "first", "second" and "third" are used for descriptive purposes only and cannot be understood as indicating or implying relative importance. The terms "first position" and "second position" are two different positions.

In the description of the invention (or general inventive concepts), it should be noted that the terms "installation", "connected" and "connection" should be understood in a broad sense unless otherwise specified and defined. For example, they can be a fixed connection, removable connection or integrated connection. They can also be a mechanical connection or electrical connection, can be directly connected, can also be indirectly connected through an intermediate medium, and can be connected inside two components. The specific meaning of the above terms in the invention can be understood in a specific case by those skilled in the art.

As shown in FIG. 1, the emergency vehicle start power supply device comprises a hollow cylinder 1, a mounting cap 2 sealed at the bottom of the cylinder 1, and a lamp head cap connected to the top of the cylinder 1. A light source is provided at a position inside the lamp head. The light source contains a super bright LED light for illumination, a signal light for SOS signals, and a flashing light for quick flashing. The lamp head comprises a metallic lamp base 3. One end of the lamp base 3 is in thread connection with the top end of the cylinder 1; while the other end of the lamp base 3 is open ended and is in thread connection with a metallic punch 4. A light-collecting cup 13 and an acrylic translucent lens 5 are positioned in sequence between the lamp base 3 and the metallic punch 4. The light-collecting cup 13 collects, concentrates, and redirects the light emitted from the light source. Alternatively, one end of the lamp base 3 may be in thread connection with a metallic case 8 instead of being in thread connection with the top end of the cylinder 1. The light-collecting cup 13 is made with metal and its surface is plated with silver. The metallic punch 4 is made by using metal-cutting technology. The open end of the lamp base 3 is installed with an acrylic translucent lens 5 for resisting dust and water. After positioning the metallic silver plated light-collecting cup 13 in the lamp base 3, the punch 4 is connected with the light-collecting cup 13, resulting in a set of lamp head system. The advantageous features of the lamp head system are as follows: the light-collecting cup 13 collects and concentrates light, in the meanwhile, introduces the heat from the light source to the lamp base 3, and emits the heat. The punch 4 is also made from metal and connected with the lamp base 3. They work together to dissipate heat, which can effectively improve safety and reliability.

The cylinder 1 is a cylindrical shell formed by fitting two pieces of half cylindrical plastic bases together. A lithium battery 6 and a management circuit board 7 are installed inside the cylinder 1. The lithium battery 6 provides electricity for the light source through the management circuit board 7. The cylinder 1 is sleeved by a metallic case 8 in a way in which the cylinder has an interference fit with the metallic case. As an example, the cylinder 1 is tightly surrounded by the metallic case 8 and is coupled to the metallic case 8 such as through a groove on the cylinder receiving a projection on the metallic case 8. A button 9 is provided on the cylinder 1 wall to control the illumination, and delivers help signals or quick flashing through the management circuit board 7. The button 9 extends upward through the metallic case 8. A rope 12 is attached to the bottom of the cylinder 1, which makes the utility model easy to be carried. In the case of emergency when driving, the LED light can be turned on for illumination through the button 9. The SOS signal light and quick flashing light can be turned on through button 9 in case that people cannot move. Through achieving the emergency illumination and signaling signal for help and quick flashing, rescue teams can find trapped people as quickly as possible. Button 9 is located on the cylinder and close to the lamp head, which meets the requirements of ergonomics and facilitates manual control.

A circuit board 14 is installed inside the cylinder 1. A charging, a discharging port, and a connection port are provided on the mounting cap 2. There may be more than one ports or interfaces (such as USB interface), so as to obtain more functions, such as for charging more devices. The charging and/or discharging port can be used for charging and discharging purpose. For example, the lithium battery 6 outputs the electricity power, successfully via the circuit board 14 and charging and/or discharging port. The lithium battery provides electricity power successfully through the circuit board 14, and connection ports, which are connected to the positive and negative terminals of a vehicle battery or the connectors of the positive and negative terminals of a vehicle battery. It should be appreciated that the power provided via the circuit board 14 to jumpstart a vehicle may be greater than the power provided via the management circuit board 7 to power the light source, as less amps are required to emit light from the light source as compared to the amps required for jumpstarting a vehicle. As described in the embodiments herein, the management circuit board 7 may control only the on/off function of light emitting from the light source, while the circuit board 14 controls the charging of the lithium battery 6 and distribution of power from the lithium battery 6, including the lesser power going to the light source and the greater power going to the connection port for jumpstarting the vehicle.

With continued reference to FIG. 1, a silicone sealing cap 10 is provided on the mounting cap 2 for sealing the charging and/or discharging port and the connection port. It is important for some time that a communication device can be kept in a normal communication. The communication device can be charged through the charging and/or discharging port so as to be kept in a normal communication with the outside world. When travelling in the wild, if the vehicle's engine is damaged, its battery is empty, and the vehicle cannot be started, the lithium battery can function as a small power supply source to charge the vehicle battery and start the vehicle, through connecting the connection port to the positive and negative terminals of the vehicle battery. As the vehicle carries with itself a lithium battery as an assistant power source, the vehicle can still drive for several miles to reach a service area or garage for repairing.

The power supply device is designed as being completely enclosed by metal in the external. The metal concerned contains the punch 4, the lamp base 3 and the metallic case 8, which are abutted and fixed with screw threads. The metallic case 8 and the cylinder 1 work together to strengthen the abutting with the lamp base 3. The lithium battery 6 and the circuit boards (the management circuit board 7 and the circuit board 14) are fixed inside through the plastic cylinder 1 and the mounting cap 2. The silicone sealing cap 10 seals the bottom of the cylinder, resisting dust and water.

In some embodiments, the power supply device (flashlight) may output multiple voltages, for example, for vehicles with different voltage requirements, and regulate temperature. In some embodiments, one or more of the circuit boards (e.g., the management circuit 7 and the circuit board 14) and/or an additional circuit board at least partially enclosed in the cylinder 1 may be provided to manage or otherwise control the outputting of multiple voltages via the power supply device and/or, for example, regulating its temperature.

Figure 2:
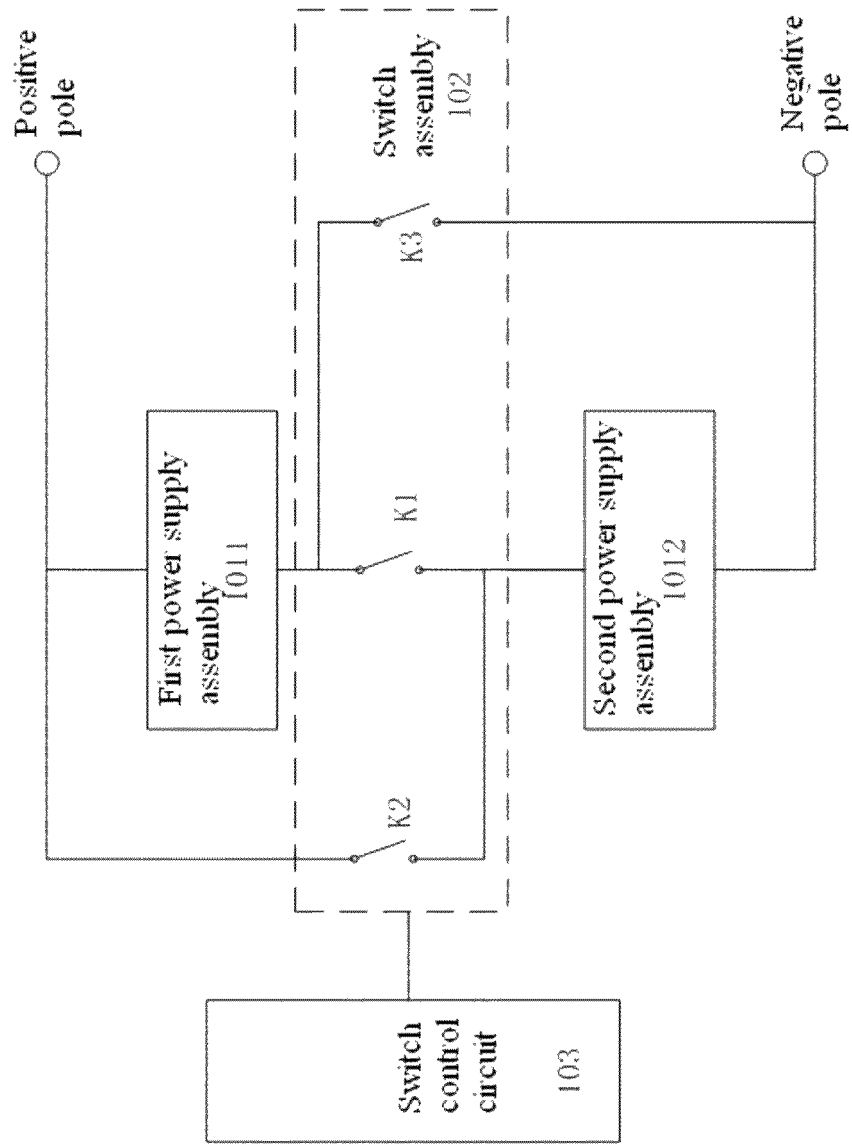
FIG. 2 is a schematic circuit diagram of an emergency power supply device (e.g., the flashlight of FIG. 1) capable of outputting multiple voltages, in accordance with the general inventive concepts.

With reference now to FIGS. 1-7, and with particular reference to FIG. 2, a power supply device configured to output multiple voltages and/or regulate temperature is provided.

As shown in FIG. 2, the power supply device (e.g., the flashlight) may include two power supply assemblies (which are respectively a first power supply assembly 1011 and a second power supply assembly 1012), a switch assembly 102, and a switch control circuit 103. Each power supply assembly 1011 and 1012 is used for outputting a specific voltage value, and two ends of each power supply assembly 1011 and 1012 are respectively electrically connected with an output end of the power supply device directly or indirectly. The switch assembly 102 comprises at least an electric control switch; and the electric control switch is connected in series between one power supply assembly 1011 and 1012 and the output end of the power supply device, and/or between different power supply assemblies 1011 and 1012. In this exemplary embodiment, the electric control switch assembly comprising three electric control switches is taken as an example for description, i.e., a first electric control switch K1, a second electric control switch K2 and a third electric control switch K3.

In FIG. 2, a first end of the first power supply assembly 1011 is electrically connected with a first end (positive pole) of the power supply device, and a second end of the first power supply assembly 1011 is connected with a first end of the first electric control switch K1. A second end of the first electric control switch K1 is electrically connected with a first end of the second power supply assembly 1012, and a second end of the second power supply assembly 1012 is connected with a second end (negative pole) of the power supply device. A first end of the second electric control switch K2 is connected with the first end of the first power supply assembly 1011, and a second end of the second electric control switch K2 is connected with the second end of the first electric control switch. A first end of the third electric control switch K3 is connected with the second end of the first power supply assembly 1011, and a second end of the third electric control switch K3 is connected with a second end of the second power supply assembly 1012. When in use, the anode and cathode ends of the power supply device can be respectively connected with the positive and negative poles of a vehicle battery.

In an exemplary embodiment, an input of the switch control circuit 103 receives a voltage switching signal; an output of the switch control circuit 103 outputs a switch control signal corresponding to the voltage switching signal to a controlled end of each electric control switch; and each electric control switch is switched on or off under control of the switch control signal, so that different power supply assemblies 1011 and 1012 are connected in series or in parallel, and thus different voltage values are outputted by the output end of the power supply device.

As shown in FIG. 2, on or off state of different electric control switches can realize the conversion of the series/parallel relations between different power supply assemblies 1011 and 1012. Referring to FIG. 2, when the first electric control switch K1 is in an off state and the second electric control switch K2 and the third electric control switch K3 are in an on state, the two power supply assemblies (1011 and 1012) are connected in parallel, and the voltage output by the power supply device is the voltage equivalent to either of the power supply assemblies. When the first electric control switch K1 is in an on state and the second electric control switch K2 and the third electric control switch K3 are in an off state, the two power supply assemblies are connected in series, and the voltage value output by the power supply device is the sum of the voltage values of the two power supply assemblies (1011 and 1012).

The switch control circuit 103 may be a micro controller unit (MCU) chip, and the number of ports of the MCU chip is determined according to the number of components to be controlled. Taking the circuit diagram of FIG. 2 as an example, the MCU chip may have three output ports, each of which can be connected with the controlled end of one electric control switch. The MCU chip may have an input which may be provided with a dial switch, where the position of the dial switch can be regulated and controlled to determine which voltage value the power supply device should output. Those of ordinary skill in the art would understand that a data table could be stored in the MCU chip. The number of external power supply assemblies and connection positions of the electric control switches have been determined, so the state of each electric control switch corresponds to the series/parallel relations between the power supply assemblies, and the series/parallel relations between the power supply assemblies correspond to a voltage value selected by the dial switch; therefore, only two sets of data are needed to be recorded in the data table: the voltage value selected by dial switch and the state of each electric control switch. In an exemplary embodiment, the output of the MCU chip can output an electric signal matching with a type of the electric control switch; for example, the controlled end of the electric control switch needs to receive a high level to be switched on, thus, a high level is outputted to the electric control switch that needs to be switched on, and a low level is outputted to the electric control switch that needs to be switched off.

Thus, the switch control circuit 103 in the above disclosed exemplary embodiment can be realized by using a commercially available MCU chip as long as the MCU chip is comfortable of storing data tables and searching data tables. When the input receives signals to determine which voltage values to output, it can be determined which electric signals need to be outputted to each electric control switch by referring to a data table for comparison. Therefore, this process can be realized by using commercially available components.

In addition, for the power supply device proposed in the above-mentioned exemplary embodiment, in addition to the exemplary circuits shown in the Figures, an exemplary embodiment of the power supply device may be equipped with a housing, and a smart clip connecting wire can be connected to the positive pole and the negative pole shown in FIG. 2 through a shell of the housing. The dial switch mentioned in the above exemplary embodiment may be disposed on an outer surface of the housing. The housing can also be provided with components such as a master switch of the power supply device, a state indicator lamp, and the like. Since the working principles of these components are known, they will not be described in detail, and those skilled in the art can implement them with reference to available literature.

In the power supply device capable of outputting multiple voltages and the control method thereof provided by exemplary embodiments, the series and parallel relations of different power supply assemblies are controlled by arranging more than two power supply assemblies and utilizing the switching on or off of electric control switches, so that the power supply device can output different voltage values. Thus, such embodiments permit users to output different voltage values using one power supply device, thus meeting the requirements of various vehicles at the lowest cost.

In the above solution, the power supply assemblies (1011 and 1012) can be implemented in the form of a power source such as a battery, preferably a rechargeable battery. In an exemplary embodiment, a plurality of lithium iron phosphate batteries connected in series are adopted to realize the required characteristics of each power supply assembly (1011 and 1012). The voltage of each lithium iron phosphate battery can be set according to the requirement of the power supply device. In the following examples, an exemplary embodiment will be described in detail with a power supply device capable of providing 6V and 12V voltage values. In another example, a power supply device capable of providing 12V and 24V will be described.

In order to meet the requirement of outputting a 6V or 12V voltage value and the requirement that the built-in battery in the vehicle can be used for the above two voltage values, both of the first power supply assembly 1011 and the second power supply assembly 1012 in this exemplary embodiment consists of two 3.2V lithium iron phosphate batteries connected in series. Further, the first electric control switch K1, the second electric control switch K2 and the third electric control switch K3 are all MOS transistors with a withstand voltage of 30V or more and an on-state current of 290 A or more, thereby being capable of satisfying a transient heavy current, wherein a gate of the MOS transistor is taken as the controlled end, and a source and a drain of the MOS transistor are taken as the first end and the second end.

Figure 3:
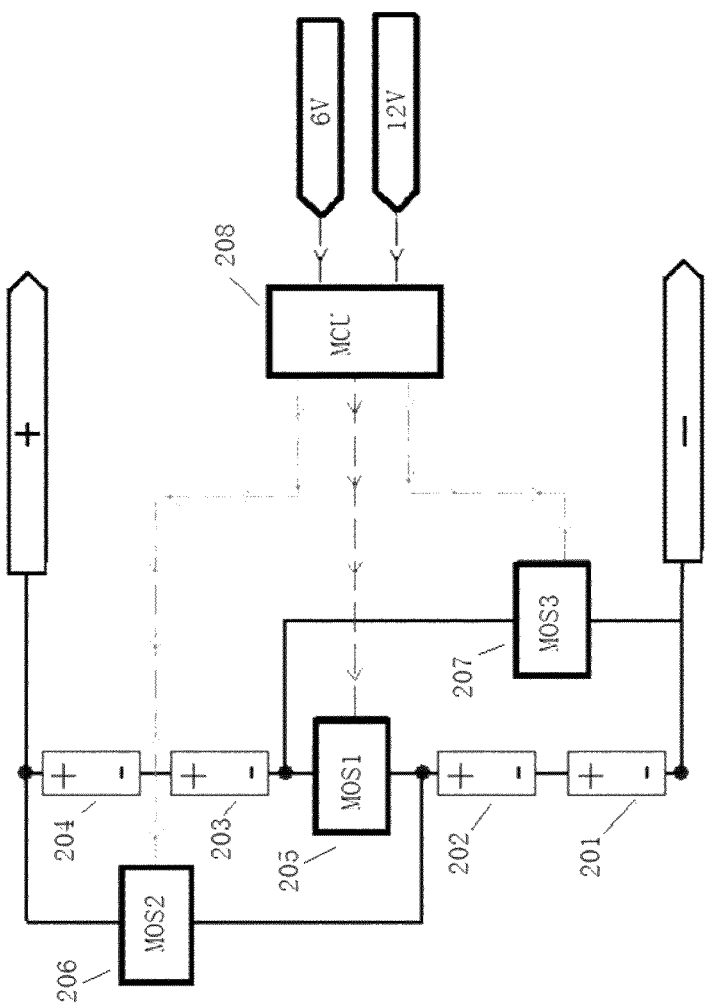
FIG. 3 is a further exemplary schematic circuit diagram of an emergency power supply device, in accordance with the general inventive concepts.

Referring to FIG. 3, wherein a first battery 201, a second battery 202, a third battery 203 and a fourth battery 204 are all 3.2V lithium iron phosphate batteries. The first battery 201 and the second battery 202 form a second power supply assembly (which can provide a 6.4V voltage value), while the third battery 203 and the fourth battery 204 form a first power supply assembly (which can provide a 6.4V voltage value). A MOS1 switch 205, a MOS2 switch 206, and a MOS3 switch 207 serve as electric control switches. An MCU chip 208 is a core device in the switch control circuit. The MCU chip 208 can use two inputs to receive voltage switching signals representing 6V mode and 12V modes respectively. A first output of the MCU chip 208 is electrically connected with a gate of the MOS1 switch 205, a second output of the MCU chip 208 is electrically connected with a gate of the MOS2 switch 206, and a third output of the MCU chip 208 is electrically connected with a gate of the MOS3 switch 207. The connection of the source and the drain of each MOS transistor is determined according to the voltages at both ends of the type (N channel or P channel) of the MOS transistor to enable the MOS transistor to realize working conditions for switching on and switching off.

Referring to FIG. 3, when an input of the MCU chip 208 receives the voltage switching signal representing a 6V mode, a switch control signal is outputted to switch off the MOS1 switch 205 and switch on the MOS2 switch 206 and the MOS3 switch 207. The voltage value outputted by the output of the power supply device is thus a voltage value produced by the first power supply assembly 1011 and the second power supply assembly 1012 connected in parallel, i.e., a 6.4V voltage value is output. When the input of the MCU chip 208 receives the voltage switching signal representing a 12V mode, a switch control signal is outputted to switch on the MOS1 switch 205 and switch off the MOS2 switch 206 and the MOS3 switch 207. The voltage value outputted by the output of the power supply device is a voltage value produced by the first power supply assembly 1011 and the second power supply assembly 1012 connected in series, i.e., a 12.8V voltage value is the output.

As previously mentioned, the positive pole and the negative pole of the power supply device can be connected to a positive pole and a negative pole of a battery of a vehicle through a smart clip connecting wire, so that an engine of the vehicle can be started. In this way, one power supply device can output either 6V or 12V voltages, thus enabling the power supply device to have the function of igniting and starting 6V and 12V devices.

In order to meet the requirement of outputting a 12V or 24V voltage value and the requirement that the built-in battery in the vehicle can require one of the above two voltage values, both of the first power supply assembly 1011 and the second power supply assembly 1012 in this exemplary embodiment consist of three 4.2V lithium iron phosphate batteries connected in series. Further, the first electric control switch K1, the second electric control switch K2, and the third electric control switch K3 are all MOS transistors with a withstand voltage of 30V or more and an on-state current of 290 A or more, thereby being capable of satisfying a transient heavy current requirement, wherein a gate of the MOS transistor is taken as the controlled end, and a source and a drain of the MOS transistor are taken as the first end and the second end.

Figure 4:
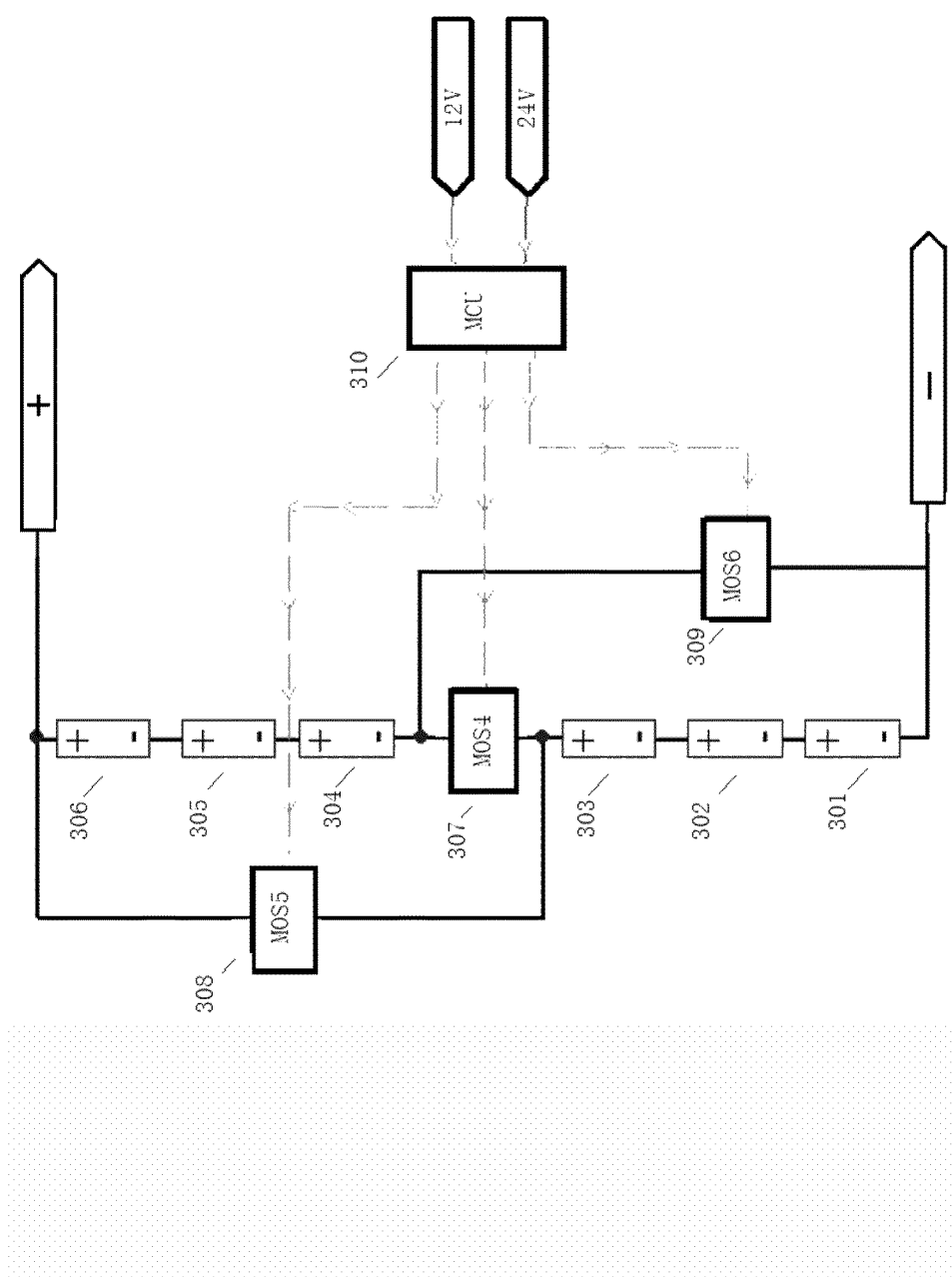
FIG. 4 is another exemplary schematic circuit diagram of an emergency power supply device, in accordance with the general inventive concepts.

Referring to FIG. 4, wherein a first battery 301, a second battery 302, a third battery 303, a fourth battery 304, a fifth battery 305 and a sixth battery 306 are all 4.2V lithium iron phosphate batteries. The first battery 301, the second battery 302 and the third battery 303 form a second power supply assembly (which can provide a 12.6V voltage value), while the fourth battery 304, the fifth battery 305 and the sixth battery 306 form a first power supply assembly (which can provide a 12.6V voltage value). A MOS4 switch 307, a MOS5 switch 308, and a MOS6 switch 309 serve as three electric control switches. A MCU chip 310 is a core device in the switch control circuit. The MCU chip 310 can use two inputs to receive voltage switching signals representing 12V mode and 24V mode respectively. A first output of the MCU chip 310 is electrically connected with a gate of the MOS4 switch 307, a second output of the MCU chip 310 is electrically connected with a gate of the MOS5 switch 308, and a third output of the MCU chip 310 is electrically connected with a gate of the MOS6 switch 309. The connection of the source and the drain of each MOS transistor is determined according to the voltages at both ends of the type (N channel or P channel) of the MOS transistor to enable the MOS transistor to realize working conditions for switching on and switching off.

Referring to FIG. 4, when the input of the MCU chip 310 receives the voltage switching signal representing a 12V mode, a switch control signal is outputted to switch off the MOS4 switch 307 and switch on the MOS5 switch 308 and the MOS6 switch 309. The voltage value outputted by the output of the power supply device is a voltage value produced by the first power supply component and the second power supply component connected in parallel, i.e., a 12.6V voltage value is output. When the input end of the MCU chip 310 receives the voltage switching signal representing a 24V mode, a switch control signal is outputted to switch on the MOS4 switch 307 and switch off the MOS5 switch 308 and the MOS6 switch 309. The voltage value outputted by the output end of the power supply device is a voltage value produced by the first power supply component (a combination of the first battery 301, the second battery 302, and the third battery 303) and the second power supply component (a combination of a fourth battery 304, a fifth battery 305, and a sixth battery 306) connected in series, i.e., a 25.2 V voltage value is output.

As previously mentioned, the positive pole and the negative pole of the power supply device can be connected to a positive pole and a negative pole of a battery of a vehicle through a smart clip connecting wire, so that an engine of the vehicle can be started. In this way, one power supply device can be configured to output 12V and 24V voltages, thus enabling the power supply device to have the function of igniting and starting 12V and 24V devices. In such a manner, the needs of ordinary household cars (12V) and engineering vehicles and trucks (24V) can be satisfied.

In the above exemplary embodiment, the way in which the switch control circuit 103 receives the voltage switching signal can be realized either manually (with a dial switch, as described above) or automatically. Preferably, an exemplary embodiment of a power supply device capable of outputting multiple voltages may also comprise a voltage sensor, wherein the voltage sensor is used for detecting a voltage value of a device to be connected and outputting a voltage signal representing the voltage value of the device to be connected; if the voltage signal is within a normal voltage value range, the voltage signal is used as the voltage switching signal.

In an exemplary embodiment, the voltage sensor may have two inputs, and the two inputs may be electrically connected with the positive pole and the negative pole of the power supply device directly and correspondingly. When the positive pole and the negative pole of the power supply device are connected to two poles of the built-in battery of the vehicle, which is equivalent to a fact that the two ends of the voltage sensor being connected to the built-in battery, the voltage sensor can detect a voltage value of the built-in battery. If the voltage value of the built-in battery is within the normal voltage value range, the voltage value can be directly used as the voltage switching signal. For example, when the voltage sensor detects that the voltage value of the built-in battery is between 14V and 26V, it can be presumed that the built-in battery is used for 24V ignition, and then the power supply device can be controlled to output a 24V voltage value. When the voltage sensor detects that the voltage value of the built-in battery is less than 14V, it can be presumed that the built-in battery is used for 12V ignition, and then the power supply device can be controlled to output a 12V voltage value.

In this solution, the power supply device can be automatically controlled to output a corresponding voltage value by automatically identifying the voltage of the built-in battery connected with the power supply device, thus avoiding manual control of the power supply device. This solution can reduce the operational difficulty, can avoid a charge impact caused by manual switch operation, and can also avoid the situation of human operation errors.

Figure 5:
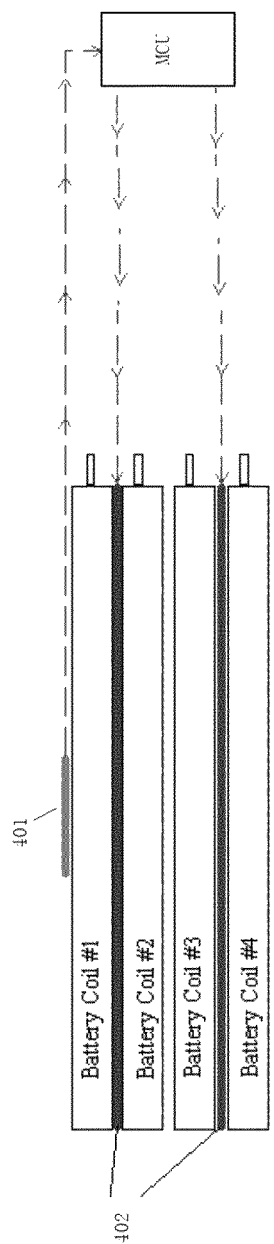
FIG. 5 is an exemplary schematic diagram of a temperature regulating structure of a power supply assembly, in accordance with the general inventive concepts.

A power supply device capable of outputting multiple voltages provided by the exemplary embodiment, as shown in FIG. 5, further comprises a temperature sensor 401 and a temperature regulating plate 402, wherein the temperature sensor is used for detecting a temperature of the power supply device and outputting a temperature signal representing the temperature of the power supply device to the switch control circuit. After the temperature signal is received by the switch control circuit, if the temperature signal indicates that the temperature of the power supply device is lower than a lower limit threshold or higher than an upper limit threshold, a temperature regulating signal is outputted by the output of the switch control circuit. The temperature regulating plate is arranged in the power supply assembly, and the temperature regulating signal is received by a controlled end of the temperature regulating plate to raise or lower the temperature of the power supply assembly.

The temperature sensor can be disposed in a housing, and when the temperature of the power supply device is detected, it is equivalent to the temperature of the power supply assembly. In general, if the signal detected by the temperature sensor is an analog signal, the signal is converted into a digital signal by an analog-to-digital conversion module before the signal enters the MCU chip.

In general, a battery has a working temperature range and a storage temperature range. Once the battery temperature falls outside of the working temperature range, the battery cannot work normally or effectively. Therefore, in this exemplary embodiment, the temperature sensor is arranged to detect the temperature of the power supply device to judge whether the power supply device can work normally. If the temperature of the power supply device is such that it cannot work normally, the temperature of the power supply assembly is regulated by the temperature regulating plate to cause the power supply device to rapidly adjust its temperature to within its working temperature range. Preferably, an indicator lamp can also be arranged on the housing, and a driving circuit of the indicator lamp can be connected with the switch control circuit. Thus, when the battery assembly needs to be heated, the indicator lamp is driven to emit light. The indicator lamp can emit red light to remind the user to wait for a period of time to permit the battery to reach the correct temperature range prior to operation. In the above exemplary embodiment, a negative temperature coefficient (NTC) temperature sensor is used.

When the power supply assembly is configured by connecting a plurality of batteries in series, as shown in FIG. 5, the temperature regulating plate 402 can be arranged between two adjacent batteries. In the above solution, the temperature sensor 401 detects the temperature of the power supply device in real time, so that the temperature signal can be transmitted to the MCU chip in real time. Once the MCU chip determines that the current temperature signal indicates that the battery assembly can work normally, a signal to stop the temperature regulation can be sent, and the temperature regulating plate 402 stops working. At this time, the indicator lamp can turn off or turn to green.

In the above technical solution provided by the exemplary embodiment, with respect to problem that the power supply device cannot be started normally in cold weather, the working principles of automatic temperature detection and automatic heating sensing are specially designed, and the MCU chip is used to control the working temperature to heat the power supply components to the normal working temperature, so that the power supply device can be used to start a vehicle in cold weather. In addition, under extremely hot conditions, exemplary embodiments replace the heating operation with a cooling operation. The control concepts are sufficiently similar such that one of ordinary skill in the art could configure the cooling operation based on the information provided herein, thus, the cooling operation will not be described in detail.

Another exemplary embodiment provides a method of controlling a power supply device capable of outputting multiple voltages.

Figure 6:
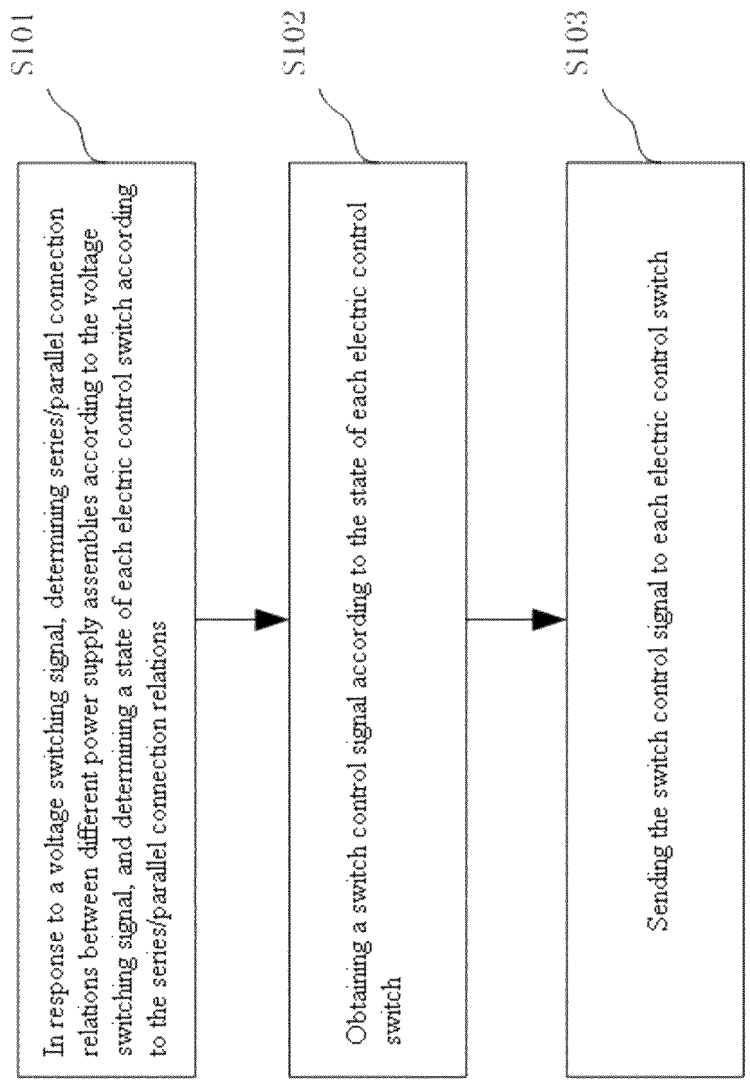
FIG. 6 is a flow chart of an exemplary control method of the emergency power supply device, in accordance with the general inventive concepts.

In such a control method, the power supply device capable of outputting multiple voltages may adopt any solution described earlier herein with regard to control of the series/parallel configuration of the power supply assembly, voltage detection, and temperature regulation of the various embodiments discussed, and the method can be applied to the MCU chip, as shown in FIG. 6, including the following steps:

In S101, in response to a voltage switching signal, determining series/parallel connection configuration of the different power supply assemblies according to the voltage switching signal, and determining a state of each electric control switch according to the series/parallel connection configurations.

In S102, obtaining a switch control signal according to the state of each electric control switch.

In S103, sending the switch control signal to each electric control switch.

A data table can be set, in which a corresponding relation between the voltage value and the state of each electric control switch is recorded. The number of external power supply assemblies and a connection position of the electric control switch are determined, the state of each electric control switch corresponds to the series/parallel relations between the power supply assemblies, and the series/parallel relations between the power supply assemblies correspond to a voltage value, so the output of the MCU chip can output an electric signal matching with a type of the electric control switch. For example, the controlled end of the electric control switch needs to receive a high level to be switched on, so a high level is outputted to the electric control switch needing to be switched on, and a low level is outputted to the electric control switch that needs to be switched off. When the input of the MCU chip receives signals to determine which voltage values to output, it can be determined which electric signals need to be outputted to each electric control switch after simple table lookup for comparison.

Figure 7:
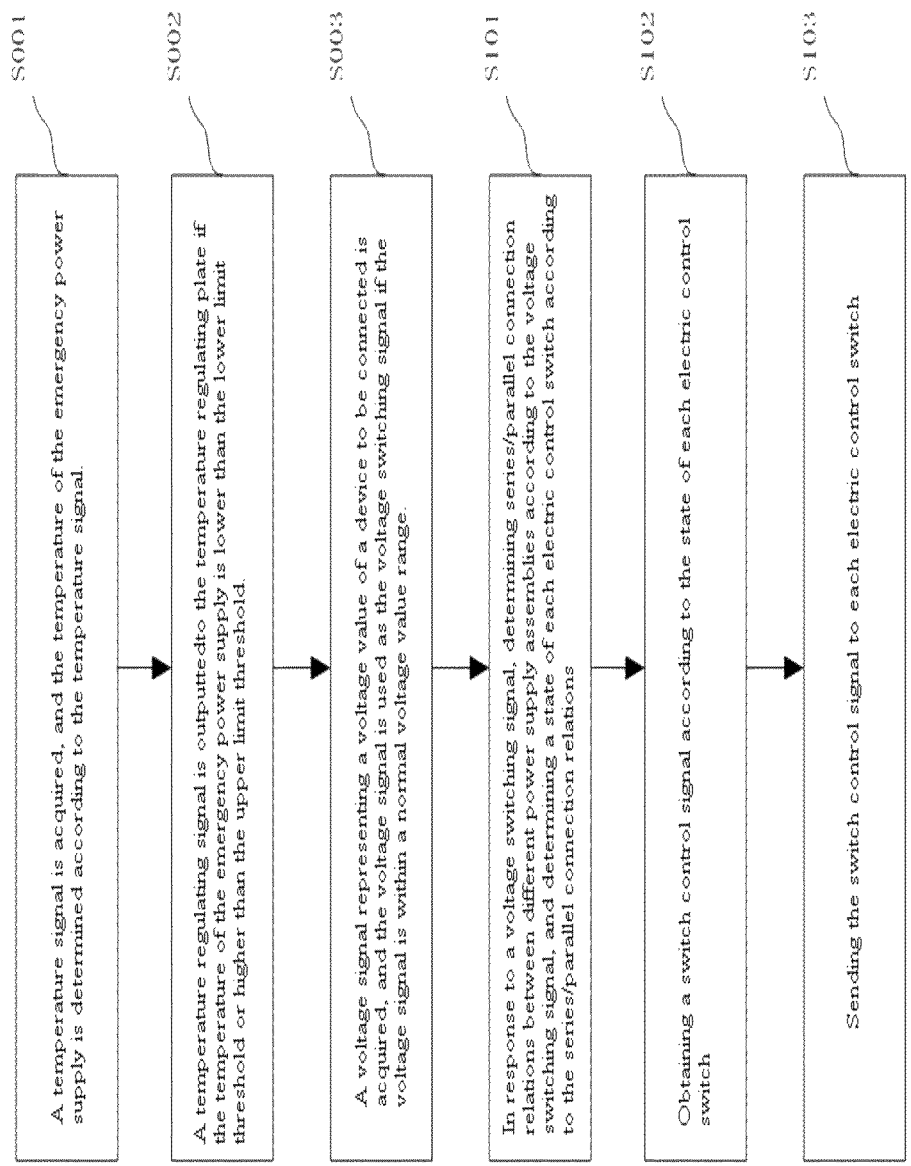
FIG. 7 is a second flow chart of an exemplary control method of the emergency power supply device, in accordance with the general inventive concepts.

Additionally, or alternatively, as shown in FIG. 7, before step S101, the method may further include the following steps:

In S001, a temperature signal is acquired, and the temperature of the power supply device is determined according to the temperature signal. The temperature signal can be obtained by the temperature sensor disposed in the power supply device as described earlier herein.

In S002, a temperature regulating signal is outputted to the temperature regulating plate if the temperature of the power supply device is lower than the lower limit threshold or higher than the upper limit threshold. For example, the lower limit threshold can be 10° C., and the upper limit threshold can be 60° C. Other upper and lower thresholds may be used depending upon factors such as the type of batteries used.

Therefore, in exemplary embodiments, the temperature sensor is arranged to detect the temperature of the power supply device to judge whether the power supply device can operate normally. If the power supply device cannot operate normally, the temperature of the power supply assembly is regulated by the temperature regulating plate to make the power supply device quickly enter a temperature range of normal operation. Preferably, an indicator lamp can also be employed wherein the indicator lamp is arranged on the housing, and a driving circuit of the indicator lamp is in communication with the switch control circuit; when the battery assembly needs to be heated, the indicator lamp is driven to emit light. In an exemplary embodiment, the indicator lamp may emit red light to remind the user to wait for a period of time before operating the power supply device. In the above solution, an NTC sensor is used as the temperature sensor.

When the power supply assembly is configured by connecting a plurality of batteries in series, the temperature regulating plate can be arranged between two adjacent batteries. In the above solution, the temperature sensor 401 detects the temperature of the power supply device in real time, so that the temperature signal can be transmitted to the MCU chip in real time. Once the MCU chip determines that the current temperature signal indicates that the battery assembly can operate normally, a signal to stop the temperature regulation can be sent, and the temperature regulating plate 402 stops attempting to regulate the battery assembly temperature. At this time, the indicator lamp can be turned off or adjusted to display a green color.

In the above technical solution provided by the exemplary embodiment, with respect to the key problem that the power supply device cannot be started normally in cold weather, the working principles of automatic temperature detection and automatic heating sensing are specially designed, and the MCU chip is used to control the working temperature to heat the power supply component to the normal working temperature, so that the power supply device can applied to start a vehicle. In addition, as was described earlier herein, under extremely hot conditions, the heating operation can be replaced with a cooling operation.

In S003, a voltage signal representing a voltage value of a device to be connected is acquired, and the voltage signal is used as the voltage switching signal if the voltage signal is within a normal voltage value range. The voltage signal can be obtained through a voltage sensor in this step. For example, when the voltage sensor detects that the voltage value of the built-in battery is between 14V and 26V, it can be considered that the built-in battery of the car, truck, or other device is used for a 24V ignition system, and then the power supply device can be controlled to output a 24V voltage value. When the voltage sensor detects that the voltage value of the built-in battery of the car, truck, or other device is less than 14V, it can be considered that the built-in battery is used for a 12V ignition system, and the power supply device can be controlled to output a 12V voltage value.

Moreover, if the voltage signal is not within the normal voltage value range, it is determined that the voltage value of the device to be connected is abnormal, and a switching-off signal is sent to each electric control switch. For example, if it is detected that the voltage value of the built-in battery exceeds 26V, a warning message of high battery voltage will be issued, and meanwhile, all the electric control switches will be turned off to protect the power supply device and the built-in battery. Based on a similar principle, if the voltage sensor can also be configured to detect the voltage value of the power supply assembly, and if the voltage value of the power supply assembly is found to be lower than 9V, a signal indicating that the power supply assembly would not function correctly and needs to be charged.

In this exemplary embodiment, the power supply device can be automatically controlled to output a corresponding voltage value by automatically identifying the voltage of the built-in battery connected with the power supply device, thus avoiding manual control of the power supply device. This solution can reduce the operation difficulty, can avoid a charge impact caused by manual switch operation, and can also avoid the situation of human operation errors.

In view of the many possible embodiments to which the principles of the disclosed invention can be applied, it should be recognized that the illustrated embodiments are only preferred examples of the invention and should not be taken as limiting the scope of the invention. All combinations or sub-combinations of features of the foregoing exemplary embodiments are contemplated by this application. The scope of the invention is defined by the following claims. We therefore claim as our invention all that comes within the scope and spirit of these claims.

We claim:

1. A handheld flashlight comprising:
   a hollow cylinder having a first end, a second end and a rechargeable battery disposed therein;
   a lamp head connected at the first end of the hollow cylinder and including a light source;
   a charging port, a discharging port, and a connection port at the second end of the hollow cylinder opposite the lamp head; and
   a management circuit disposed with the hollow cylinder and connected to the rechargeable battery for distributing power to one or more of the light source, the discharging port, and the connection port;
   wherein the charging port is connectable to an external power source or an external load for charging the rechargeable battery;
   wherein the discharging port is connectable to one or more external devices for charging the one or more external devices via power from the rechargeable battery;
   wherein the connection port is connectable to a positive and negative terminal of a vehicle battery for powering a vehicle via the rechargeable battery;
   wherein the management circuit manages the distribution of power from the rechargeable battery to one or more of the light source, the charging port, the discharging port, and the connection port, such that a first distributed power to the connection port is greater than a second distributed power to the light source.

2. The handheld flashlight of claim 1 further comprising:
   a window breaker disposed at an end of the hollow cylinder opposite the light source.

3. The handheld flashlight of claim 2 further comprising:
   a sealing cap for removably sealing one or more of the charging port, the discharging port, and the connection port.

4. The handheld flashlight of claim 1, wherein the lamp head includes a lamp base connected to the first end of the hollow cylinder.

5. The handheld flashlight of claim 4 further comprising:
   a light-collecting cup and an acrylic translucent lens positioned in sequence from the lamp base, wherein the light-collecting cup is positioned to at least collect, concentrate and redirect the light emitted from the light source.

6. The handheld flashlight of claim 1, wherein the window breaker includes a punch.

7. The handheld flashlight of claim 6, wherein the punch includes a raised and wavy edge arranged about the hollow cylinder to contact a window prior to the hollow cylinder when using the handheld flashlight to strike the window.

8. The handheld flashlight of claim 1, wherein the hollow cylinder is formed from two pieces of half cylindrical plastic bases.

9. The handheld flashlight of claim 1 further comprising:
   a metallic case having an interference fit outside the hollow cylinder.

10. The handheld flashlight of claim 1 further comprising:
    a button disposed on the hollow cylinder and operably connected to the light source for controlling light emitting therefrom.

11. The handheld flashlight of claim 1 wherein the light source includes one or more of a constant illumination, a distress signal, and a discontinuous illumination.

12. The handheld flashlight of claim 11, wherein the light source is an LED light.

13. The handheld flashlight of claim 11, wherein the distress signal is an SOS signal.

14. The handheld flashlight of claim 11 further comprising:
    a button disposed on the hollow cylinder and operably connected to the light source for controlling light emitting therefrom.

15. The handheld flashlight of claim 1, wherein the handheld flashlight is a compact size and low weight for single-handed portable operation.

16. The handheld flashlight of claim 1 further comprising:
    a switch control circuit operably connected to the rechargeable battery for outputting multiple voltages via one or more of the handheld flashlight ports.

17. The handheld flashlight of claim 1 further comprising:
    a temperature regulator operably connected one or more of the charging port, the discharging port, the connection port, and the rechargeable battery for regulating a temperature of the handheld flashlight.

* * * * *